United States Patent [19]

Ross et al.

[11] Patent Number: 4,876,667

[45] Date of Patent: Oct. 24, 1989

[54] DATA STORAGE DEVICE HAVING A PHASE CHANGE MEMORY MEDIUM REVERSIBLE BY DIRECT OVERWRITE

[75] Inventors: Randall R. Ross, Murray Hill, N.J.; Eric Bjornard, Concord, Calif.; David Strand, West Bloomfield, Mich.

[73] Assignee: Energy Conversion Devices, Inc., Troy, Mich.

[21] Appl. No.: 64,645

[22] Filed: Jun. 22, 1987

[51] Int. Cl.⁴ .................... G11C 13/00; G11B 3/70; G01D 15/10
[52] U.S. Cl. .................... 365/113; 365/163; 365/215; 346/76 L; 369/286; 430/945
[58] Field of Search ............ 365/113, 106, 120, 127, 365/163, 215, 112, 114; 346/76 L, 135.1, 137; 357/2; 369/277, 283, 286; 430/945, 19

[56] References Cited

U.S. PATENT DOCUMENTS

| | | | |
|---|---|---|---|
| 4,633,273 | 12/1986 | Watanabe et al. | 346/135.1 |
| 4,660,175 | 4/1987 | Strand | 365/113 |
| 4,719,594 | 1/1988 | Young et al. | 365/113 |
| 4,744,055 | 5/1988 | Hennessey | 365/113 |

OTHER PUBLICATIONS

Watanabe et al., "New Optical Recording Material for Video Disc System", Journal of Applied Physics, vol. 54, No. 3, Mar. 1983, pp. 1256–1260.

Primary Examiner—Stuart N. Hecker
Assistant Examiner—Glenn A. Gossage
Attorney, Agent, or Firm—Richard M. Goldman; Marvin S. Siskind; Kenneth M. Massaroni

[57] ABSTRACT

Disclosed is an optical data storage device having a reversible, phase change data storage medium formed of $(Sb_2Te_3)_{1-x}(Sb_2Se_3)_x$, where x is from 0.18 to 0.43.

2 Claims, 2 Drawing Sheets

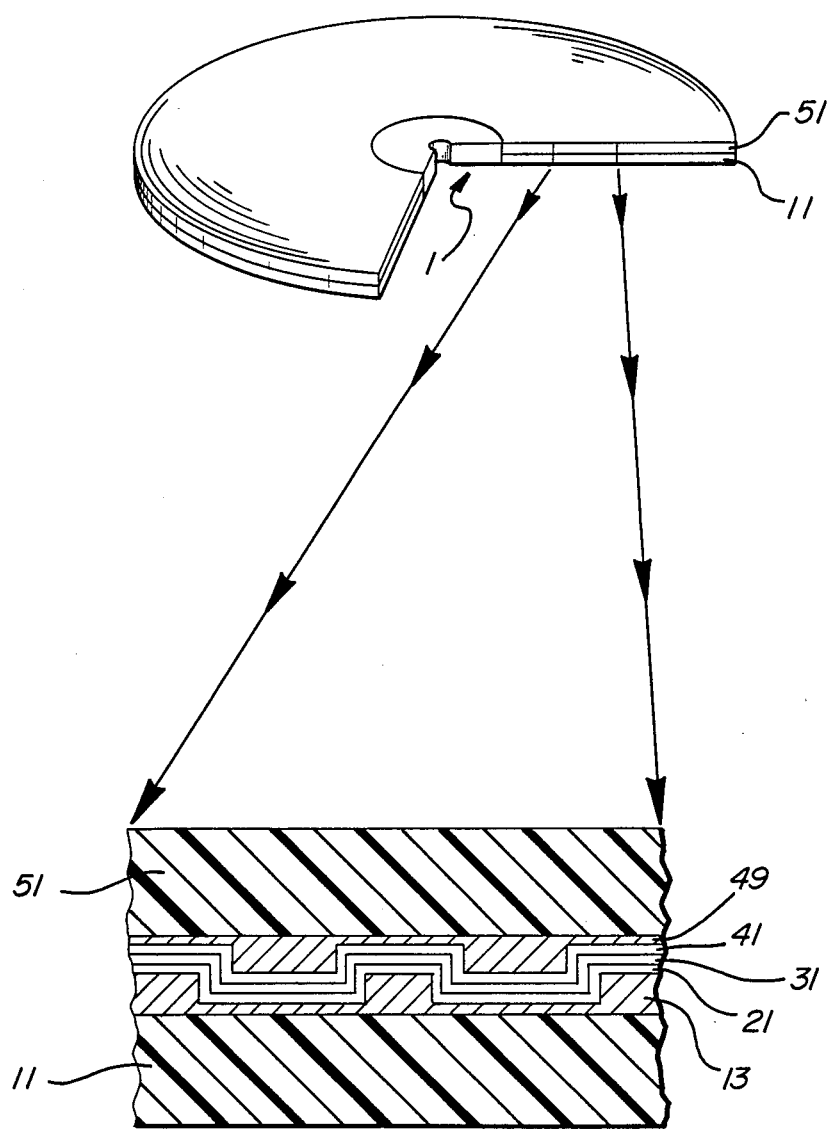

DATA STORAGE DEVICE HAVING A PHASE CHANGE MEMORY MEDIUM REVERSIBLE BY DIRECT OVERWRITE

FIELD OF THE INVENTION

The invention disclosed herein relates to data storage devices, where data is stored in a material that is reversibly switchable between detectable states by the application of projected beam energy thereto.

BACKGROUND OF THE INVENTION

Nonablative state changeable data storage systems, for example, optical data storage systems, record information in a state changeable material that is switchable between at least two detectable states by the application of projected beam energy thereto, for example, optical energy.

State changeable data storage material is incorporated in a data storage device having a structure such that the data storage material is supported by a substrate and encapsulated in encapsulants. In the case of optical data storage devices, the encapsulants include, for example, anti-ablation materials and layers, thermal insulation materials and layers, anti-reflection materials and layers, reflective layers, and chemical isolation layers. Moreover, various layers may perform more than one of these functions. For example, anti-reflection layers may also be anti-ablation layers and thermal insulating layers. The thicknesses of the layers, including the layer of state changeable data storage material, are optimized to minimize the energy necessary for state change and optimize the high contrast ratio, high carrier to noise ratio, and high stability of state changeable data storage materials.

The state changeable material is a material capable of being switched from one detectable state to another detectable state or states by the application of projected beam energy thereto. State changeable materials are such that the detectable states may differ in their morphology, surface topography, relative degree of order, relative degree of disorder, electrical properties, optical properties including indices of refraction and reflectivity, or combinations of one or more of these properties. The state of state changeable material is detectable by the electrical conductivity, electrical resistivity, optical transmissivity, optical absorption, optical refraction, optical reflectivity, or combinations thereof.

Formation of the data storage device includes deposition of the individual layes, for example by evaporative deposition, chemical vapor deposition, and/or plasma deposition. As used herein plasma deposition includes sputtering, glow discharge, and plasma assisted chemical vapor deposition.

Tellurium based materials have been utilized as state changeable materials for data storage where the state change is a structural change evidenced by a change in reflectivity. This effect is described, for example, in J. Feinleib, J. deNeufville, S.C. Moss, and S.R. Ovshinsky, "Rapid Reversible Light-Induced Crystallization of Amorphous Semiconductors," *Appl. Phys. Lett.*, Vol. 18(6), pages 254–257 (Mar. 15, 1971), and in U.S. Pat. No. 3,530,441 to S.R. Ovshinsky for Method and *Apparatus For Storing And Retrieving Of Information*. A recent description of tellurium-germanium-tin systems, without oxygen, is in M. Chen, K. A. Rubin, V. Marrello, U. G. Gerber, and V. B. Jipson, "Reversibility And Stability of Tellurium Alloys for Optical Data Storage," *Appl. Phys. Lett.*, Vol. 46(8), pages 734–736 (Apr. 15, 1985). A recent description of tellurium-germanium-tin systems with oxygen is in M. Takenaga, N. Yamada, S. Ohara, K. Nishiciuchi, M. Nagashima, T. Kashibara, S. Nakamura, and T. Yamashita, "New Optical Erasable Medium Using Tellurium Suboxide Thin Film," *Proceedings, SPIE Conference on Optical Data Storage,* Arlington, Va., 1983, pages 173–177.

Tellurium based state changeable materials, in general, are single or multi-phased systems (1) where the ordering phenomena include a nucleation and growth process (including both or either homogeneous and heterogeneous nucleations) to convert a system of disordered materials to a system of ordered and disordered materials, and (2) where the vitrification phenomenon includes melting and rapid quenching of the phase changeable material to transform a system of disordered and ordered materials to a system of largely disordered materials. The above phase changes and separations occur over relatively small distances, with intimate interlocking of the phases and gross structural discrimination, and are highly sensitive to local variations in stoichiometry.

A serious limitation to the rate of data storage is the slow ordering or erasing time. One aspect of the slow ordering time is the sensitivity of the ordering time to variables such as the manufacturing history, and the service life history, i.e., the order-disorder cycle history. For example, in order to attain high ordering rates, e.g., on the order of 0.1 to 10 microseconds, it is sometimes necesary to age the device or to introduce seed crystals and/or nucleation sites after deposition of the chalcogenide state change layer, but prior to the deposition of subsequent layer, e.g., barrier and encapsulant layers. Another aspect of this problem is that switching or ordering time can increase with increasing order-disorder cycles. This increase in the switching or ordering time with order-disorder cycles is identified with increasing order in the disordered material or portions thereof.

A still further aspect of this problem is the time required for the erase-rewrite cycle. In prior art systems a two laser erase-write cycle is utilized. With the first laser an entire track or data segment or sector thereof is erased (crystallized). Thereafter, the entire track or a data segment or sector thereof is written, e.g., by programmed vitrification.

In order to attain rapid data storage it is necessary to have both high crystallization rates, for example less then 1 microsecond, and direct over write. Moreover the cycle life of the reversible data storage medium should be as high as possible.

SUMMARY OF THE INVENTION

According to the invention herein contemplated there is provided a data storage device having a chalcogenide compound or mixture of chalcogenide compounds as the data storage medium. The material exhibits crystallization times of under 1 microsecond (1000 nanoseconds), direct overwrite capability, and a long cycle life. A substrate supports the medium, and a dielectric film encapsulates the chalcogenide compound data storage medium.

It is believed that the chalcogen data storage medium undergoes structural transformation with minimal compositional change so as to exhibit rapid ordering phenomenon, e.g., crystallization. Thus, the chalcogen data storage material provides reduced time for switching from the less ordered detectable state to the more ordered detectable state.

The chalcogenide data storage medium is a miscible solid solution of a telluride and a selenide, as arsenic telluride-arsenic selenide, antimony telluride-antimony selenide, or bismuth telluride-bismuth selenide. Especially preferred is the composition antimony telluride-antimony selenide.

The telluride-selenide composition appear to be substantially miscible and substantially single phase (i.e., it is believed to be iso-structural) in each of the amorphous and crystalline states. Preferably, the telluride-selenide composition has a crystallization temperature low enough and a fast enough crystallization time to avoid damage or degradation of the substrate, and to allow the use of relatively inexpensive solid state lasers for writing and erasing, but high enough to provide a measure of archival thermal stability. Preferably the crystallization temperature is from above about 120 degrees Centigrade and even above e.g. to about 200 degrees Centigrade or even higher. Preferably the telluride-selenide composition has a switching time, i.e., an "erase" time or "crystallization" time of less than 1 microsecond, and preferably less then 300 nanoseconds.

In a particularly preferred exemplification the telluride-selenide composition is $(Sb_2Te_3)_{1-x}(Sb_2Se_3)_x$, where x is from 0.18 to 0.43, and preferably from 0.20 to 0.35.

In a further exemplification, one or more of writing data into a data storage device, reading data out of the data storage device, or erasing data from the data storage device is performed. The method comprises writing data into the data storage medium with electromagnetic energy of a first energy density and duration, reading the state of the data storage medium with electromagnetic energy of a second energy density and duration, and overwriting data into the data storage medium atop the unerased data already present with electromagnetic energy of a proper energy density and duration, for example of the same energy density and duration as the first write, or at a different energy density and duration.

The data storage medium may be formed by depositing the materials to form a substantially uniform deposit thereof. The deposit has a thickness of an even multiple of one quarter of the product of the optical index of refraction of the material and the laser wavelength.

THE DRAWINGS

The invention may be particularly understood by reference to the drawings appended hereto.

FIG. 1 is a partial cut away isometric view, not to scale, with exaggerated latitudinal dimensions and vertical scale, of an optical data storage device.

FIG. 2 is a detailed section of the part of the optical data storage device of FIG. 1 showing the relationship of the various layers thereof.

DETAILED DESCRIPTION OF THE INVENTION

Figure 3:
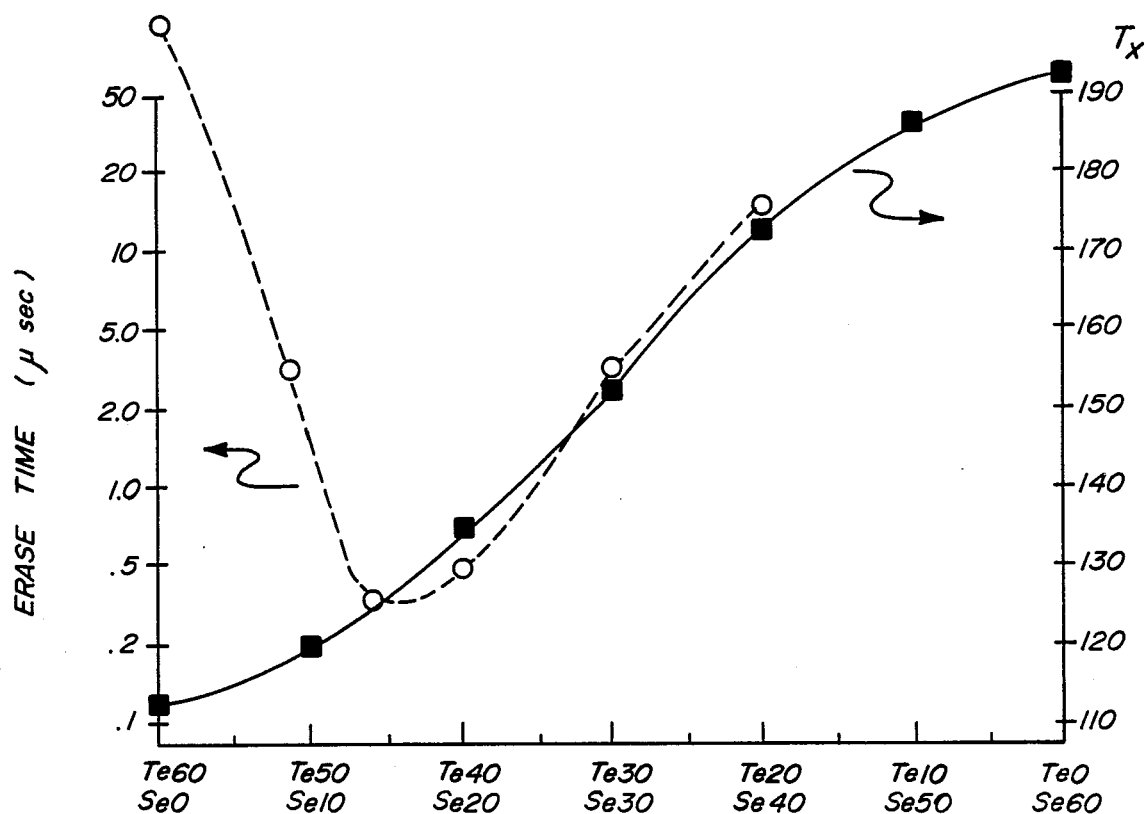
FIG. 3 is a representation of (a) the switching time, and (b) the crystallization temperature measured at a heating rate of 1 degree centigrade per second, both versus the variable x in the formula $(Sb_2Te_3)_{1-x}(Sb_2Se_3)_x$, i.e., as a function of Se and Te contents.

According to the invention described herein, there is provided a projected beam storage device having a data storage medium switchable between detectable states by the application of projected beam energy thereto.

FIGS. 1 and 2 show a projected beam data storage device 1 having a substrate, for example a plastic substrate 11, a first encapsulating dielectric layer 21, for example a first germanium oxide encapsulating layer, the herein contemplated chalcogenide compound data storage medium layer 31, a second dielectric layer 41, e.g., a second germanium oxide layer 41, and a second substrate, e.g., plastic substrate 51.

FIG. 2 shows a section of the data storage device 1 of FIG. 1 in greater detail. As there shown, the substrate 11 is a polymeric sheet, for example a polymethyl methacrylate sheet. The substrate 11 is an optically invariant, optically isotropic, transparent sheet. The preferred thickness is of from about 1 mm to about 1.5 mm.

Atop the substrate 11 is a film, sheet, or layer 13, e.g., a photoinitiated, polymerized acrylic sheet. Polymerized, molded, injection molded, or cast into the polymeric sheet 13 may be grooves. When grooves are present they may have a thickness from about 500 to about 1000 Angstroms. The film, sheet, or layer 13 may act as an adhesive, holding the substrate 11 to the encapsulants. It has a thickness of from about 30 to about 200 microns and preferably from about 50 to about 100 microns.

Deposited atop the photo-polymerized sheet 13 is a dielectric barrier layer 21. The dielectric barrier layer 21, for example, of germanium oxide, is from about 500 to about 2000 angstroms thick. Preferably it has a thickness of 1030 Angstroms and an optical thickness of one-quarter times the laser wavelength times the index of refraction of the material forming the dielectric layer 21. The dielectric barrier layer 21 has one or more functions. It serves to prevent oxidizing agents from getting to the chalcogen active layer 31 and prevents the plastic substrate from deforming due to local heating of the chalcogenide layer 31, e.g., during recording or erasing. The barrier layer 21 also serves as an anti-reflective coating, increasing the optical sensitivity of the chalcogenide active layer 31.

Other dielectrics may provide the encapsulating layers 21, 41. For example, the encapsulating layers may be silicon nitride, layered or graded to avoid diffusion of silicon into the chalcogenide layer 31. Alternatively, the encapsulating dielectric layers 21, 41 may be silica, alumina, silicon nitride, or other dielectric.

The chalcogenide compound data storage medium behaves as a miscible solid solution of the telluride and the selenide. That is, the selenide and the telluride are substantially capable of being mixed in substantially all proportions, e.g., a single phase, in both the crystalline and the amorphous states.

The telluride-selenide chalcogenide compounds are telluride-selenides of one or more Group VB elements, i.e., one or more As, Sb, or Bi. Especially preferred is the telluride-selenide of antimony, $(Sb_2Te_3)_{1-x}(Sb_2Se_3)_x$. The value of x is determined by the balance of the switching speed (crystallization time or erase time), and the crystallization temperature.

As shown in FIG. 3, the switching speed is a relative minumum in the vicinity of x between 0.18 and 0.43, with values of x from 0.20 to 0.35 yielding the fastest erase times.

As further shown in FIG. 3, the crystallization temperature increases with increasing selenium content. Thus, for archival stability higher selenium contents are indicated. Preferably the crystallization temperature is above 120 degrees centigrade, e.g. up to 200 degrees centigrade or even higher.

The switching times of the $(Sb_2Te_3)_{1-x}(Sb_2Se_3)_x$, especially when x is from about 0.2 to about 0.35 result in an erase (crystallization) time of less than 0.5 microseconds. This permits the use of a circular laser beam spot for erasing rather than the elliptical laser beam erase spot of prior art materials. As a result, erasure can be accomplished simultaneously with writing by single beam overwrite.

The chalcogenide compound data storage medium 31 has an optical thickness of one half of the laser wavelength times the index of refraction of the data storage material, i.e., about 800 Angstroms. Atop the chalcogenide layer 31 and in contact with the opposite surface thereof is a second dielectric layer 41, e.g., a germanium oxide layer. The second dielectric layer 41 may, but need not be of equal thickness as the first layer 21. Preferably it has a thickness of one half times the laser wavelength times the index of refraction. A second photopolymer layer 49 and a second substrate layer 51 may be in contact with the opposite surface of the encapsulating layer 41, alternatively an air sandwich structure may be utilized.

The polyacrylate layers 13, 49, are cast or molded in place. These layers 13, 49 can be photo-polymerized in place, e.g., by the application of ultra-violet light. The barrier layers 21, 41, are deposited, by evaporation, for example, of germanium and germanium oxide materials, or by sputtering, including reactive sputtering where the oxygen content of the reactive gas used in reactive sputtering is controlled. The chalcogenide film 31 may be prepared by evaporation, or by sputtering, or by chemical vapor deposition.

While the invention has been described with respect to certain preferred exemplifications and embodiments thereof it is not intended to be bound thereby but solely by the claims appended hereto.

We claim:

1. In an optical data storage memory device comprising a substrate, a dielectric first encapsulating layer on the substrate, a memory layer on the dielectric first encapsulating layer, and a dielectric second encapsulating layer atop the memory layer, the improvement wherein the memory layer is a non-ablative, reversible, phase change memory layer comprising a solid solution of antimony, selenium, and tellurium, said solid solution being single phase in the amorphous and crystalline states, having a crystallization temperature above 120 degrees Centigrade, and having the composition $$(Sb_2Te_3)_{1-x}(Sb_2Se_3)_x$$

where x is from 0.18 to 0.43.

2. In an optical data storage memory device comprising a substrate, a dielectric first encapsulating layer on the substrate, a memory layer on the dielectric first encapsulating layer, and a dielectric second encapsulating layer atop the memory layer, the improvement wherein:
   (a) the memory layer has a nominal thickness of 800 Angstroms, is a non-ablative, reversible, phase change memory layer comprising a solid solution of antimony, selenium, and tellurium, said solid solution being single phase in the amorphous and crystalline states, having a crystallization temperature above 120 degrees Centigrade, and having the composition;

$$(Sb_2Te_3)_{1-x}(Sb_2Se_3)_x$$

where x is from 0.20 to 0.35;
   (b) the dielectric first encapsulating layer has a nominal thickness of 1030 Angstroms and comprises germanium oxide;
   (c) the dielectric second encapsulating layer has a nominal thickness of 2060 Angstroms and comprises germanium oxide; and
   (d) the memory device has a crystallization time of less then 300 nanoseconds at 8300 Angstrom incident laser radiation.

* * * * *